United States Patent [19]

Prokop

[11] 4,336,720
[45] Jun. 29, 1982

[54] LOAD SENSING SYSTEM
[75] Inventor: James A. Prokop, St. Paul, Minn.
[73] Assignee: Lull Engineering Company, Inc., St. Paul, Minn.
[21] Appl. No.: 180,376
[22] Filed: Aug. 22, 1980
[51] Int. Cl.³ ........................ G01D 1/00; B66C 13/50
[52] U.S. Cl. ............................... 73/862.53; 73/862.56
[58] Field of Search ........... 73/862.53, 862.54, 862.56, 73/862.58; 414/698, 699; 212/149, 154

[56] References Cited
U.S. PATENT DOCUMENTS

| 2,931,638 | 4/1960 | Weber | 73/862.58 X |
| 3,612,294 | 10/1971 | Wilkinson | 212/154 X |
| 3,680,714 | 8/1972 | Holmes | 212/154 |
| 3,814,265 | 6/1974 | Miller | 212/149 |
| 3,963,127 | 6/1976 | Eriksson | 212/149 |
| 4,147,263 | 4/1979 | Frederick et al. | 414/718 |

FOREIGN PATENT DOCUMENTS
2020167 11/1971 Fed. Rep. of Germany ...... 212/149

Primary Examiner—Charles A. Ruehl
Attorney, Agent, or Firm—Burd, Bartz & Gutenkauf

[57] ABSTRACT

A sensing system for a load carrying vehicle having a hydraulically controlled load carrier which is subjected to cantilever loading such that tipping of the vehicle may occur. The vehicle includes a load bearing frame and an axle supporting that frame. The frame is mounted through a sub-frame assembly so as to be separable to a limited degree from the axle. The initiation of this separation signals the dangerous load condition. A load sensing device disposed between the axle and the sub-frame assembly detects the initiation of separation of the sub-frame from the axle. The sensor functions as a mechanically actuated relief valve in the hydraulic system by which cantilever loading is accomplished. Flow of hydraulic fluid from the sensing device functions to prevent further extension of the load which could induce tipping. Details of the sub-frame assembly and sensing device are disclosed.

8 Claims, 6 Drawing Figures

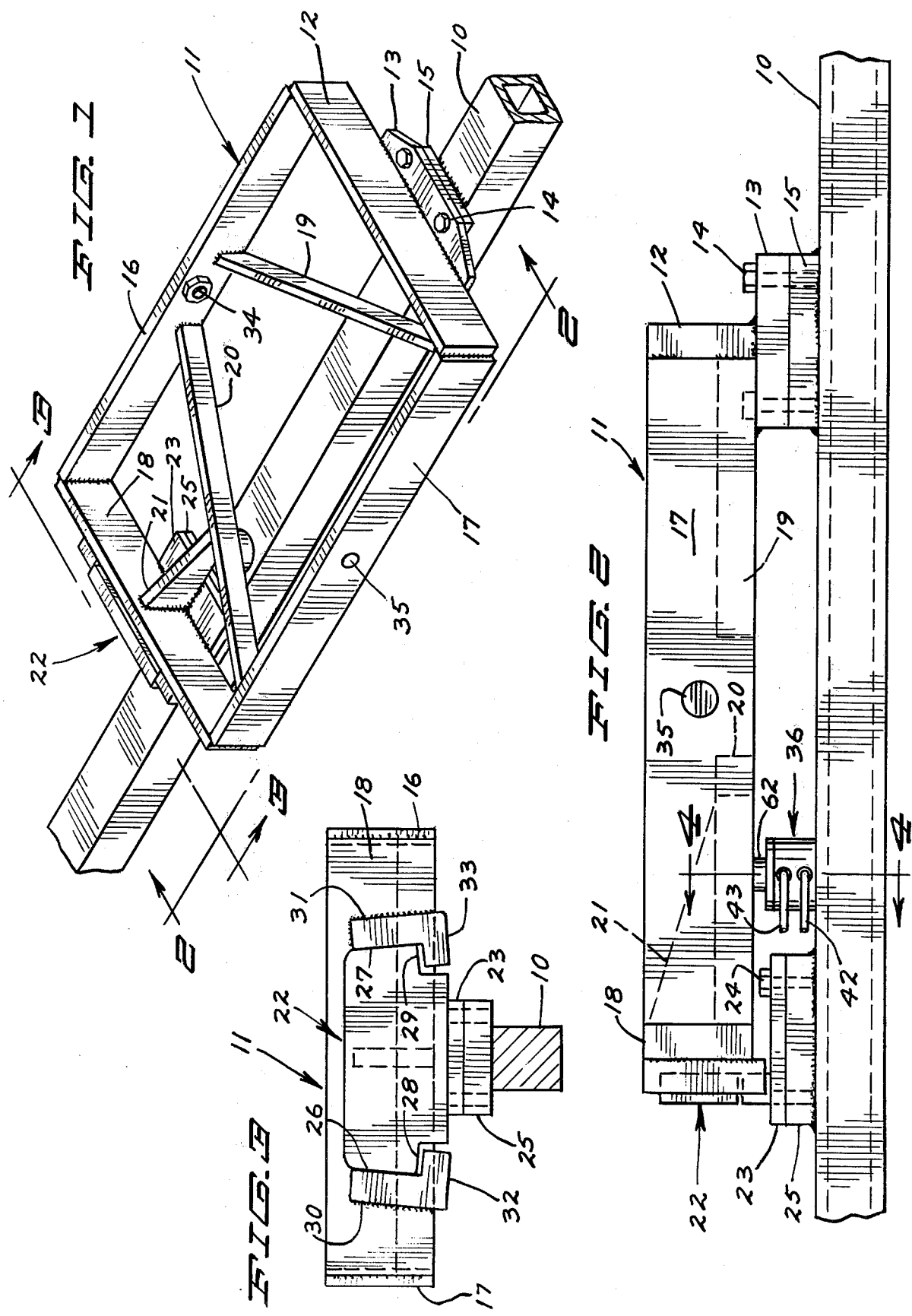

LOAD SENSING SYSTEM

FIELD OF THE INVENTION

Background of the Invention

This invention is directed to a load sensing system for vehicles subjected to cantilever loading. The system is for the purpose of detecting the result of the sum of variable conditions which, through an infinite combination of weight, distance, height and vehicle attitude, can cause tipping of the vehicle with possible injury to the vehicle, to the load which it is carrying, to the operator, and to workmen and equipment in the vicinity of the loader vehicle. The system functions by detecting the result of the combination of conditions which may lead to tipping which manifests itself by lifting the load bearing wheels from the ground. The system functions to make the operator aware of the fact that the load has reached the limit of safe extension, and to render inoperative all controls which, if activated, could induce tipping.

One exemplary form of loader vehicle with which the sensing system of the present invention may be used is the high lift loader disclosed in Frederick et al U.S. Pat. No. 4,147,263, the disclosure of which is incorporated herein by reference. That loader is characterized by a fork lift or other load handling device carried at the end of an extendible telescopic boom, which in turn is carried by a longitudinally extendible transfer carriage supported in a frame carried by the vehicle axles. The frame is mounted for limited pivotal movement on a longitudinal axis so that the loader may be used on a slope or other non-level terrain. Extension and lifting of the load is accomplished by double acting hydraulic cylinders. It is easy to conceive of circumstances which, because of the weight of the load being carried, the distance it is extended forwardly of the vehicle, the height to which it is raised, and the attitude of the vehicle itself relative to level, may, if the operator does not exercise great care, cause the vehicle to tip. The present invention is directed to a system to alert the operator short of the critical tipping condition to inactivate his controls so that corrective action can be taken.

The Prior Art

No prior art is known which is directed to a mechanical system for preventing tipping of loader vehicles subjected to cantilever loading.

SUMMARY OF THE INVENTION

The invention is directed to a sensing system for a load carrying vehicle having a hydraulically controlled load carrier which is subjected to cantilever loading such that tipping of the vehicle may occur. A hydraulic system including double acting cylinders lifts and extends the load carrier. The vehicle includes a load bearing frame and an axle supporting that frame. The frame is mounted through a sub-frame assembly so as to be separable to a limited degree from the axle. The initiation of this separation signals the dangerous load condition. The sub-frame assembly includes a longitudinally extending deflection beam at one end through which the sub-frame assembly is securely fastened to the axle. At the opposite end of the sub-frame assembly, a tapered bolster plate is securely fastened to the vehicle axle and a pair of spaced apart movement limiting bars are secured to the sub-frame in engagement with the bolster plate. This secures the sub-frame to the axle but permits limited relative movement therewith. A load sensing device in the form of a mechanically actuated relief valve is disposed between the axle and the sub-frame assembly adjacent to the movable end of the sub-frame to detect the initiation of separation of the sub-frame from the axle. The sensing device is connected into the hydraulic system to disable further movement of the load carrier responsive to flow of hydraulic fluid from the sensing device to prevent further lifting or extension of the load which could induce tipping.

The load sensing device comprises a cylindrical housing having a pair of axially spaced apart hydraulic fluid ports in its wall for connection to the hydraulic system of the vehicle. The housing has a fixed bottom including an annular seal plate and a movable cover. A control piston is adapted for limited reciprocal movement in the housing. The top of the control piston is secured to the housing cover and the bottom normally engages the seal plate. The control piston includes a pair of axially spaced circumferential annular channels, each of which is in communication with one of the hydraulic fluid ports. A longitudinal channel within the control piston permits flow of fluid from the inlet channel to the outlet channel when the sensing device is operative to disable the load carrier controls. The control piston has a cylindrical recess in its top in which a smaller spring biased sensitive piston is adapted for limited reciprocal movement. This sensitive piston has an upward extension projecting in sealed relationship through a central opening in the housing cover. This upward extension engages the sub-frame while the sensing device housing rests on the axle. A fluid bleed passage permits continuous flow of a small amount of hydraulic fluid from the inlet channel through the sensitive piston recess to the outlet channel, as described more fully hereinafter.

The initial slight separation of the sub-frame assembly from the axle induced when the load being carried approaches tipping conditions permits the sensitive piston to be moved, which in turn permits the control piston to be moved so as to permit flow of hydraulic fluid to control means to disable the system against further extension of the load carrier, all as described fully hereinafter.

BRIEF DESCRIPTION OF THE DRAWINGS

The invention is illustrated by the accompanying drawings in which corresponding parts are identified by the same numerals and in which:

FIG. 1 is an isometric view showing a load carrying sub-frame assembly of a mobile loader supported on the axle thereof;

FIG. 2 is an elevation of the axle and sub-frame assembly on the line 2—2 of FIG. 1 and in the direction of the arrows;

FIG. 3 is an end elevation on the line 3—3 of FIG. 1 and in the direction of the arrows showing engagement of the bolster plate and movement limiting bars;

DETAILED DESCRIPTION OF THE PREFERRED EMBODIMENT

Figure 4:
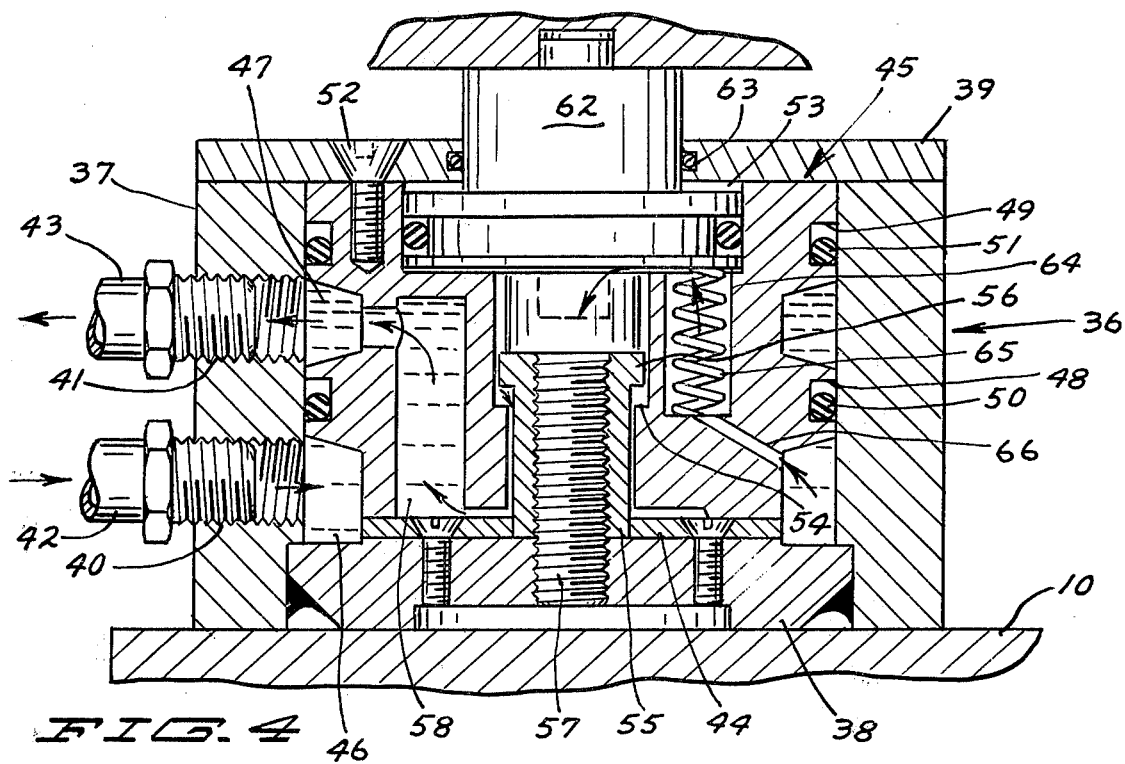
FIG. 4 is a vertical section on an enlarged scale on the line 4—4 of FIG. 2 and in the direction of the arrows showing details of construction of the load sensing device in its normal at-rest position.

Referring now to the drawings, and particularly to FIGS. 1 through 3, there is shown the axle 10 of a load carrying vehicle subjected to cantilever loading. A sub-frame assembly, indicated generally at 11, is disposed on the top side of the axle. The sub-frame assembly is rectangular in form and includes a longitudinally extending horizontal deflection beam 12 securely fastened to axle 10, as for example by being welded to plate 13 and bolted by bolts 14 to plate 15 which is welded to the top surface of the axle 10. A pair of parallel spaced apart transverse horizontal beams 16 and 17 are welded at one end to deflection beam 12 and at the other to a longitudinally extending horizontal bolster beam 18. A plurality of braces 19-21 welded to the interior of the sub-frame insures a strong rigid assembly.

A longitudinally extending bolster thrust plate 22 is securely fastened to the axle at the end of the sub-frame opposite from the deflection beam 12. Bolster plate 22 is fastened, for example, by means of welding to a support plate 23 fastened by means of bolts 24 to a plate 25 welded to the top surface of axle 10. As seen in FIG. 3, the opposite ends 26 and 27 of the bolster plate taper upwardly and inwardly. The bottom ends of the bolster plate 22 are recessed to form shoulders 28 and 29. A pair of movement limiting bars 30 and 31 are securely fastened as by welding to the outside surface of bolster beam 18 of the sub-frame assembly. The inside edges of bars 30 and 31 taper upwardly and inwardly so as to engage the corresponding tapered ends 26 and 27, respectively, of the bolster plate 22 to transmit the weight of the sub-frame and the load which it carries to the bolster plate and axle. Each movement limiting bar has an inwardly projecting extension or hook tab 32 and 33, respectively, whose inside surfaces are positioned and adapted to engage bolster plate shoulders 28 and 29, respectively, to limit lifting movement of the sub-frame assembly and the load which it carries from axle 10. The frame of the loader may be pivoted relative to the vehicle wheels and axles on a longitudinal axis by mounting on a shaft or other suitable fittings journaled in the sub-frame assembly at 34 and 35.

When the cantilevered load being carried by the loader approaches tipping conditions, the positive rear axle load is reduced to near zero. Through the special mechanical means described, the sub-frame is enabled to slightly separate from the axle. Deflection beam 12 is so designed as to deflect slightly from the gravitational force acting on the free end of the axle during separation. The arrangement permits separation at negative axle load while locking the frame and axle together under normal operating conditions.

A sensor control device, indicated generally at 36, mounted between the sub-frame and axle, detects the slight separation of the sub-frame from the axle to activate appropriate valves to stop the flow of hydraulic fluid to any and all cylinder sides that further cantilever load while leaving the operator with control of fluid to retract or reduce cantilever. Under normal operating conditions, the sensor device is not subjected to any vehicle weight or load.

Figure 5:
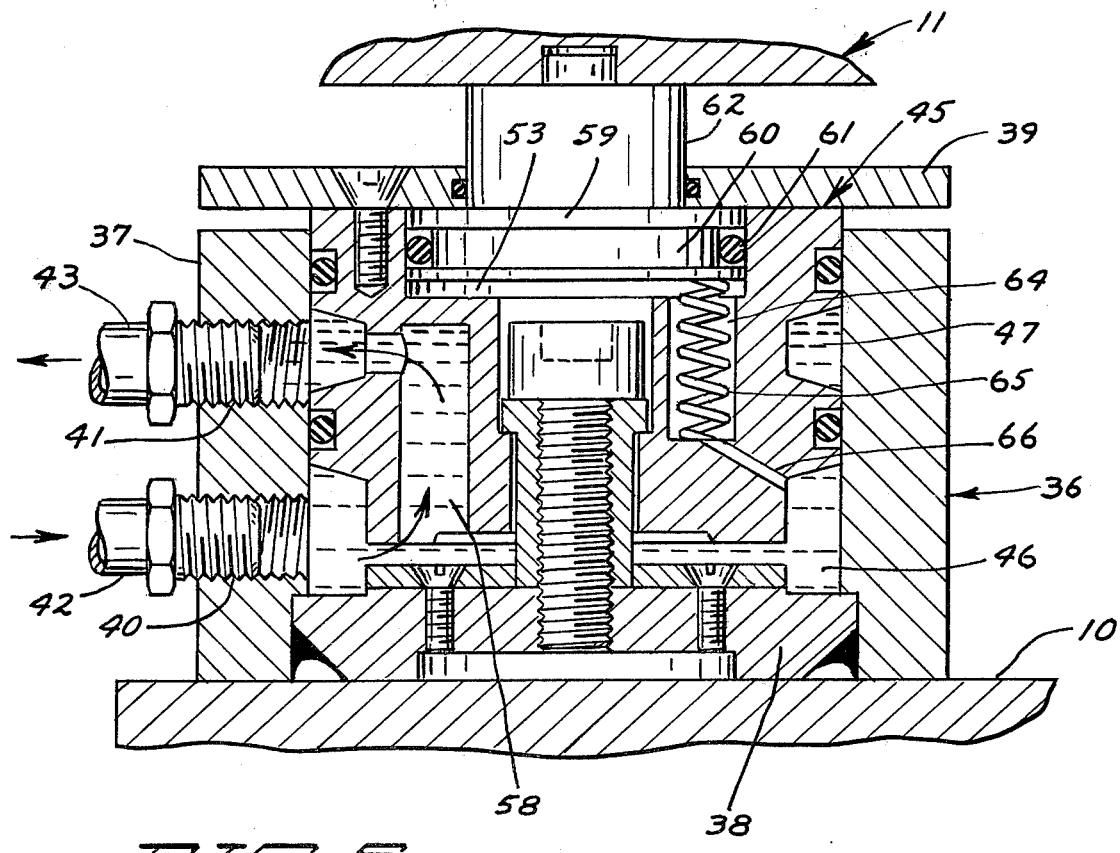
FIG. 5 is a similar section showing the sensing device in its operative position.

Referring now to FIGS. 4 and 5, the details of construction of the separation sensing device 36 are shown in normal at-rest and control disabling positions, respectively. The sensing device comprises a cylindrical housing 37 having a fixed bottom 38 and movable cover 39. A pair of axially spaced apart ports 40 and 41 adapted to receive fittings from hydraulic fluid inlet and outlet lines 42 and 43, respectively, extend through the housing wall.

An annular seal plate 44 is disposed in the bottom of the cylindrical chamber within the sensor housing. Seal plate 44 is desirably formed from a rigid but relatively soft and deformable material, such as a synthetic resinous plastic or aluminum, such that in the event that a metal chip or other foreign particle gains entrance to the cylinder, it may be forced to sink into the sealing surface so as not to otherwise hold the control piston 45 off its seat.

The control piston, indicated generally at 45, is positioned within the cylindrical chamber of the sensor housing for limited reciprocal movement. The control piston is provided with a first circumferential channel or inlet annulus 46 in direct fluid communication with inlet port 40 and an axially spaced apart circumferential channel or outlet annulus 47 in direct fluid communication with outlet port 41. A pair of annular grooves 48 and 49 spaced on opposite sides of circumferential channel 47 and fitted with O-rings 49 and 50, or similar seal rings, maintain a sliding seal between the control piston and cylinder wall. The top of the control piston is secured to cover 39 by a plurality of screws 52. The bottom of the control piston normally engages seal plate 44 in sealing engagement.

A central cylindrical recess 53 is formed in the top of control piston 45. A central axial aperture 54 extends from the bottom of the cylindrical recess to the bottom of the control piston. The upper end of aperture 54 is of larger diameter than the lower end so that a shoulder is formed at the juncture between the upper and lower ends of the aperture. A tubular sleeve is disposed in aperture 54 with a loose slide fit such that fluid may pass through the annular space between the sleeve and aperture. The top end of sleeve 55 is provided with an outwardly extending flange or collar 56, the bottom edge of which is adapted to engage the shoulder of aperture 54. Sleeve 55 is maintained rigidly secured to the sensor housing by means of a screw 57. The maximum length of the stroke of control piston 55 is determined by the distance between the sleeve collar 56 and the shoulder in aperture 54 when the control piston is in at-rest position. The collar limits the upward stroke of the control piston, a safety feature.

A longitudinally extending passage 58 from the bottom of the control piston to circumferential channel 47 permits flow of hydraulic fluid from inlet channel 46 to outlet channel 47 when the control piston is in its upper position, as seen in FIG. 5. Ordinarily this flow is blocked by virtue of the sealing engagement of the bottom of the control piston with sealing plate 44. Thus, the control piston functions as a valve preventing normal flow of hydraulic fluid from inlet line 42 to outlet line 43.

A smaller diameter sensitive piston 59 is disposed for limited reciprocal movement in recess 53 in the top of the control piston. Sensitive piston 59 is provided with a circumferential groove 60 in which is fitted an O-ring 61 or similar sealing ring to maintain sealing engagement between the piston 59 and wall of the cylindrical recess. An upwardly projecting height adjuster pad or piston extension member 62 extends through a central aperture in the housing cover 39 and engages the sub-frame. An O-ring 63 in a peripheral groove around the central opening maintains a sealing engagement between the member 62 and housing cover. The height adjuster pad or member 62 externally adjusts the height of piston 59 and permits a dirt/dust seal to be incorporated in the cover. Member 62 may be integral with the piston 59 but desirably is separate. The height of the height adjustment member 62 is such that when the sensor unit 36 is installed on a vehicle between the axle 10 and sub-frame assembly 11, the sensor unit is not subjected to any vehicle weight or load. However, when the sub-frame assembly begins to separate from the axle as a result of an excessive load, then, as explained hereafter, because of the force exerted on member 62 from within the sensor unit, member 62 moves upwardly in response to the frame separation activating the sensor control.

A plurality of recessed spring seats 64 (of which only one is shown) are uniformly spaced apart in the bottom of cylindrical recess 53 around aperture 54. Preferably four such recessed spring seats are provided. A compressed coil spring 65 is seated in each recess. The top end of each spring 65 extends into the cylindrical recess and engages the bottom surface of sensitive piston 59, the springs exerting upward force on the sensitive piston and downward force on the control piston.

A bleed hole 66 is provided between the circumferential inlet fluid channel 46 in the control piston and the cylindrical recess 53, in this instance through spring recess 64. Fluid line 42 is connected to a source of hydraulic fluid under pressure. A small percentage of this fluid passes through the bleed passage 66 and recess 64 into the bottom of recess 53. The bleed fluid thence passes through aperture 54 through the annular space between the aperture and sleeve 55 into longitudinal passage 58 into circumferential channel 47 and out through outlet line 43. This bleed fluid serves four functions simultaneously. First, it warms up the unit to increase responsiveness. Secondly, it exerts upward force on the sensitive piston 59 to cause the height adjuster or extension member 62 to move immediately in response to axle/frame separation. Thirdly, it creates a down force, always in proportion to inlet pressure, on the control piston to effect a better seal between the bottom of the piston and seal plate. Lastly, this same down force also temporarily cancels the up force generated in the inlet annulus 46.

In the operation of the sensing system, when the various load factors are such that tipping of the loaded vehicle is imminent, the positive rear axle load is reduced to near zero. Then the special mechanical means of the sub-frame assembly including the deflection beam 12, bolster plate 22, limiting bars 30-31 and hook tabs 32-33, permit limited separation of the frame from the axle. When this occurs, the height adjuster extension member 62 of the sensing control moves upwardly in response to the upward forces exerted upon sensitive piston 59, primarily by virtue of the upward force exerted by the bleed fluid and to a lesser extent by spring pressure acting under the sensitive piston. As the axle/frame separation occurs, the sensitive piston contacts the cover plate 39. At this moment, lockup occurs between the sensitive piston and the control piston 45. This cancels all down force on the control piston and enables up force created by the fluid pressure in the inlet annulus 46 to lift the control piston off its seat with seal plate 44 in proportion to the axle/frame separation. The full flow of fluid from the inlet 40 to the outlet 41 through passage 58 causes relief now to take place to stop all cantilever increasing fluid flow. Relief is maintained until the operator reduces cantilever force and regains positive axle loading.

Figure 6:
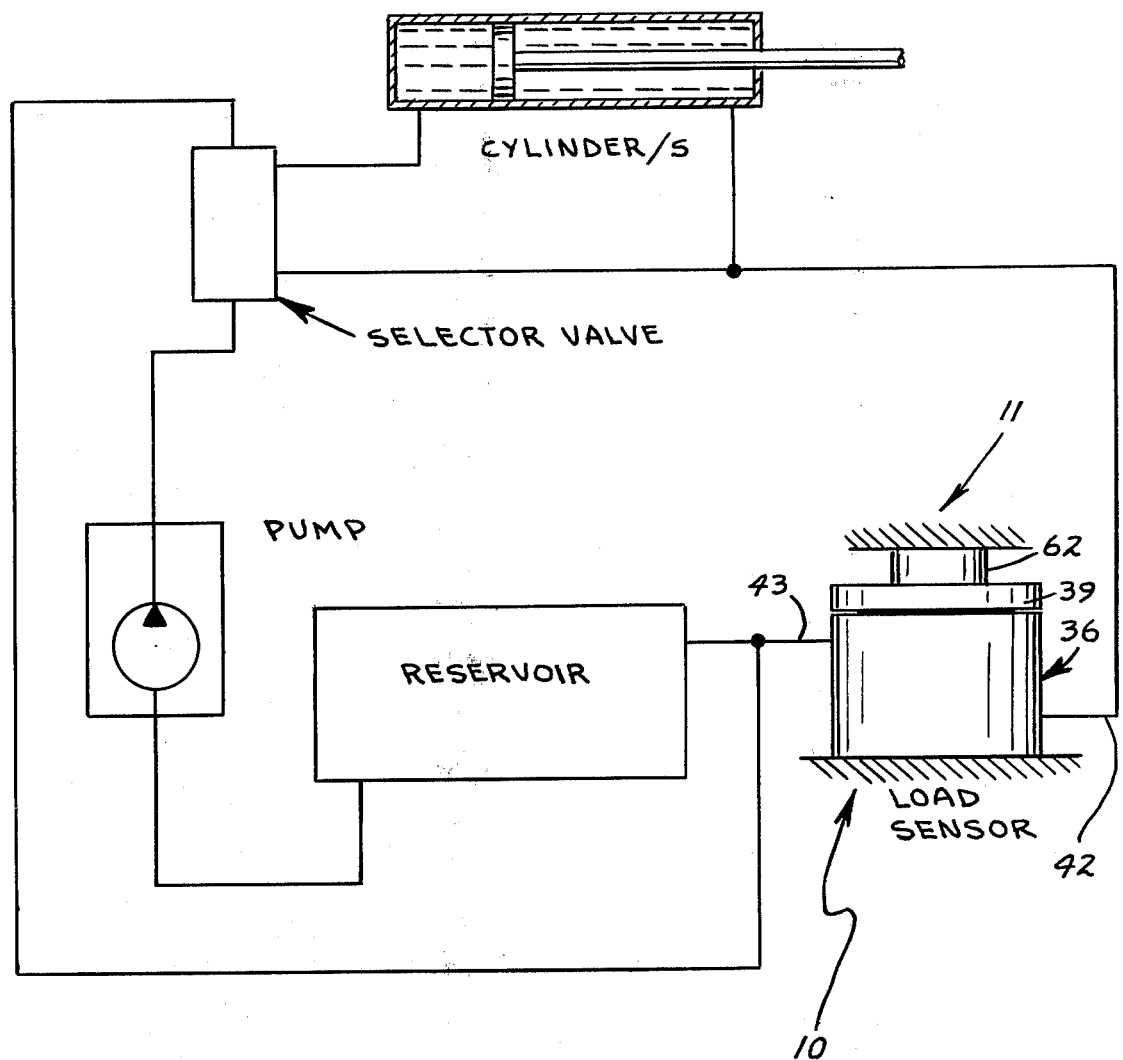
FIG. 6 is a schematic illustration of a hydraulic system incorporating the sensing device.

As seen schematically in FIG. 6, the sensing unit functions basically as a mechanically actuated relief valve. Hydraulic lines serving double acting cylinders that promote cantilever loading are manifolded to the sensor inlet. When a load is in a configuration which maintains positive axle loading, no relief occurs. When positive axle loading nears zero, all fluid flow which would permit further extension of the load is disabled, but the operator is free to retract the load to correct the conditions tending to induce tipping.

When the axle and frame reunite, the sensitive piston 59 is forced downwardly to contact the control piston 45 and push it down. However, because there is an intended space to be maintained between the bottom of the sensitive piston and the cylindrical recess in the control piston, and bleed pressure is not occurring, the force exerted by the sensitive piston upon springs 65 pushes the control piston down to its seat in contact with the sealing plate and, at the same time, the springs push the sensitive piston upward to maintain frame contact. Bleed pressure is restored and the sensor unit is reactivated to detect the next incipient tipping episode.

Although the invention is described in terms of a sub-frame assembly disposed between a separate load-bearing main frame and the axle, the sub-frame assembly of course is part of the load bearing frame and bears the load of the main frame. In some installations the sub-frame assembly may be integral with the main frame with the deflection beam built into the main frame. The operation of the system remains precisely as described.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A load sensor system for a load carrying vehicle having a hydraulically controlled load carrier subject to cantilever loading, said vehicle including a load bearing frame and an axle supporting said frame, said sensor system comprising:
   (A) a sub-frame assembly comprising part of the load bearing frame by which said frame is secured to said axle so as to be partially separable therefrom,
   (B) a hydraulic system including double acting cylinders for lifting and extending the load carrier, and
   (C) a mechanically actuated relief valve load sensing device connected into said hydraulic system and disposed between said axle and sub-frame assembly.

2. A load sensor system according to claim 1 wherein:
   (A) a longitudinally extending tapered bolster plate is securely fastened to the vehicle axis adjacent one end of the sub-frame assembly, and
   (B) said sub-frame assembly includes:
      (1) a longitudinally extending deflection beam at one end, said deflection beam being securely fastened to the axle, and
      (2) a pair of spaced apart movement limiting bars at the opposite end of the sub-frame in engagement with said bolster plate to secure the sub-frame to the axle for limited relative movement therewith.

3. A load sensor system according to claim 2 wherein:
   (A) each end of said bolster plate has a shoulder-forming recess, and
   (B) each of said movement limiting bars has an inwardly extending tab engageable with said bolster shoulders to limit relative movement between the sub-frame assembly and axle.

4. A load sensor system according to claim 1 wherein said load sensing device comprises:
   (A) a cylindrical housing having a pair of axially spaced apart hydraulic fluid ports in the housing wall for connecting the sensing device in the hydraulic system, and
   (B) a control piston within said housing adapted for limited reciprocal movement therein responsive to separation of the sub-frame assembly from the axle for controlling flow of hydraulic fluid through the housing.

5. A load sensor system according to claim 1 wherein said loading sensing device comprises:
   (A) a cylindrical housing having a pair of axially spaced apart hydraulic fluid ports in the housing wall, said housing having a fixed bottom and movable cover,
   (B) an annular seal plate in the bottom of said housing,
   (C) a control piston within said housing adapted for limited reciprocal movement therein, the top end of said piston being secured to said housing cover and the bottom end normally engaging said seal plate,
   (D) a pair of axially spaced apart circumferential fluid inlet and outlet channels in said piston, each channel communicating with one of said ports,
   (E) a longitudinal channel within the piston body for permitting flow of fluid from the inlet to outlet channel,
   (F) a cylindrical recess in the top of said control piston,
   (G) a spring biased sensitive piston adapted for limited reciprocal movement in said recess, said sensitive piston having an upward extension projecting in sealed relationship through a central opening in said housing cover, and
   (H) a fluid bleed passage from said inlet channel of the control piston, through said sensitive piston recess, to the outlet channel.

6. A loading sensing system according to claim 5 wherein said annular seal plate is composed of a relatively soft deformable material.

7. A load sensing system according to claim 5 wherein:
   (A) said control piston has a central axial aperture from the cylindrical recess in the top of the piston to the bottom of the piston,
   (B) the upper end of said aperture is of larger diameter forming a shoulder at the juncture with the lower end of the aperture,
   (C) a tubular sleeve is disposed in said aperture with a loose slide fit,
   (D) the top end of said sleeve is provided with an outwardly extending annular collar engageable with said shoulder, and
   (E) a screw extending through said sleeve threadably engages the bottom of the housing to fix the sleeve in place.

8. A load sensing system according to claim 5 wherein:
   (A) a plurality of recessed spring seats, uniformly spaced apart, are provided in the bottom of said cylindrical recess, and
   (B) a compressed coil spring is disposed in each of said seats, the upper end of each spring engaging the bottom of the sensitive piston.

* * * * *